(12) United States Patent
Ishii

(10) Patent No.: US 7,944,513 B2
(45) Date of Patent: May 17, 2011

(54) DISPLAY DEVICE

(75) Inventor: Hiromitsu Ishii, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 362 days.

(21) Appl. No.: 12/185,034

(22) Filed: Aug. 1, 2008

(65) Prior Publication Data

US 2009/0040408 A1 Feb. 12, 2009

(30) Foreign Application Priority Data

Aug. 10, 2007 (JP) ................................ 2007-209490

(51) Int. Cl.
*G02F 1/1343* (2006.01)

(52) U.S. Cl. ......................................................... 349/39

(58) Field of Classification Search ....................... 349/39
See application file for complete search history.

(56) References Cited

U.S. PATENT DOCUMENTS

| | | | | |
|---|---|---|---|---|
| 5,132,820 | A * | 7/1992 | Someya et al. | 349/43 |
| 5,182,620 | A * | 1/1993 | Shimada et al. | 257/72 |
| 5,295,008 | A * | 3/1994 | Mizobata et al. | 349/51 |
| 5,602,658 | A * | 2/1997 | Ezra et al. | 349/95 |
| 6,621,537 | B1 * | 9/2003 | Nakamura et al. | 349/43 |
| 2004/0174483 | A1 | 9/2004 | Nakamura et al. | |

FOREIGN PATENT DOCUMENTS

| | | |
|---|---|---|
| CN | 200410028211.2 | 9/2004 |
| JP | 06-130412 A | 5/1994 |
| JP | H07-175453 A | 7/1995 |
| KR | 2004-0103275 A | 12/2004 |

OTHER PUBLICATIONS

Chinese Office Action in counterpart application CN 200810145623.2, dated Aug. 28, 2009, citing foreign patent document No. 1 above.
Korean Office Action in counterpart application KR 10-2008-0076229, dated Mar. 24, 2010, citing Foreign Patent Document Nos. 1-2 above.

* cited by examiner

*Primary Examiner* — James A Dudek
(74) *Attorney, Agent, or Firm* — Chen Yoshimura LLP

(57) ABSTRACT

A display device includes a substrate having a display area; a plurality of scanning lines and a plurality of data lines, arranged in the display area over the substrate, wherein the data lines extend substantially orthogonally to the scanning lines; a plurality of switching elements each connected to respective one of the scanning lines and to respective one of the data lines; a plurality of pixel electrodes each connected to respective one of the switching elements; and a plurality of storage capacitance lines disposed substantially in parallel with the data lines, each of the storage capacitance lines having a portion overlapping with a portion of the pixel electrode, the storage capacitance lines being disposed on a plane on which the data lines are disposed and being made of the same material as the data lines.

23 Claims, 11 Drawing Sheets

DISPLAY DEVICE

TECHNICAL FIELD

The present invention relates to a display device such as a liquid crystal display device and, more specifically, to a display device having storage capacitance lines.

CROSS-REFERENCE TO RELATED APPLICATIONS

This application is based upon and claims the benefit of priority from prior Japanese Patent Application No. 2007-209490, filed Aug. 10, 2007, the entire contents of which are incorporated herein by reference.

BACKGROUND ART

In the conventional liquid crystal display device of active matrix type, a plurality of scanning lines and a plurality of data lines are arranged to extend in a row direction and a column direction, namely mutually orthogonally, in a display area. A pixel electrode is arranged in each region surrounded with adjacent scanning lines and adjacent data lines and connected via a thin film transistor as a switching element to a scanning line and a data line.

In the liquid crystal display device described in JP H07-175453 A, a plurality of storage capacitance lines for forming storage capacitances with pixel electrodes are arranged so that each of the storage capacitance lines extends in the direction of a row, namely parallel to a scanning line. The storage capacitance lines are arranged in a common plane with the scanning lines and arranged to intersect with the data lines arranged in a plane different from this plane.

Explanation is made about a driving method of the conventional liquid crystal display device. Upon selecting a certain scanning line and applying a potential of high level to the selected scanning line, all the data lines are supplied with respective image signals to write the image signals in all the pixel electrodes connected via the thin film transistors to that scanning line. After the lapse of a constant selection time period, the potential on that signal line is reduced to low level. After that, the next scanning line is selected and the writing is likewise performed. Thereafter, such writings are repeated to write image information for one screen. Thus, to write image information for one screen, each of the scanning lines is selected (i.e., driven) only once while the data lines are driven numerous times corresponding to the number of the scanning lines.

The electric power consumption of the data lines for one screen is obtained by the [voltage amplitude]×[write capacitance to be driven]×[the number of times writing/driving operations are performed]. While the voltage amplitude on a data line (e. g., 5 volts) is one fifth to one seventh of the voltage amplitude of on a scanning line (e.g., 30 volts), the number of times the writing operation is performed on a data line is the number of the scanning lines (e.g., several hundreds), so that the power consumption at the data lines is considerably larger than the power consumption at the scanning lines.

In the conventional liquid crystal display device, because the storage capacitance lines overlap with the data lines, a parasitic capacitance is generated where the storage capacitance lines and data lines cross with each other. This parasitic capacitance presents a problem in that it is one of the causes of the increased power consumption at date lines.

Accordingly, an object of the present invention is to provide a display device that reduces the power consumption of data lines.

SUMMARY OF THE INVENTION

In a first aspect of the present invention, the present invention provides a display device including a substrate having a display area; a plurality of scanning lines and a plurality of data lines, arranged in the display area over the substrate, wherein the data lines extend substantially orthogonally to the scanning lines; a plurality of switching elements each connected to respective one of the scanning lines and to respective one of the data lines; a plurality of pixel electrodes each connected to respective one of the switching elements; and a plurality of storage capacitance lines disposed substantially in parallel with the data lines, each of the storage capacitance lines having a portion overlapping with a portion of the pixel electrode, the storage capacitance lines being disposed on a plane on which the data lines are disposed and being made of the same material as the data lines.

In a second aspect, the present invention provides a display device including a substrate having a display area; a plurality of scanning lines and a plurality of data lines arranged in the display area over the substrate, wherein the data lines extend substantially orthogonally to the scanning lines; a plurality of thin film transistors, each of which has a semiconductor thin film, a gate electrode connected to respective one of the scanning lines, a gate insulating film, a source electrode and a drain electrode connected to respective one of the data lines; a plurality of pixel electrodes connected to the thin film transistors, respectively; a display element disposed over each of the pixel electrodes; and a plurality of storage capacitance lines formed parallel to the data lines, wherein the data lines and the storage capacitance lines are formed on the gate insulating film, and each of the storage capacitance lines has a portion overlapping with at least a portion of the pixel electrodes and includes a layer of metal formed of a material that is the same as that of the data lines.

In a third aspect, the present invention provides a display device including a substrate having a display area; a plurality of scanning lines and a plurality of data lines, arranged in the display area over the substrate, wherein the data lines extend substantially orthogonally to the scanning lines; a plurality of thin film transistors, each of which has a semiconductor thin film, a gate electrode connected to respective one of the scanning lines, a gate insulating film, a source electrode and a drain electrode connected to respective one of the data lines; a plurality of pixel electrodes connected to respective one of the thin film transistors; a display element arranged as opposed to the pixel electrodes; a plurality of storage capacitance lines formed parallel to the data lines; and an storage capacitance electrode layer arranged opposite to the pixel electrodes, each of the storage capacitance electrode layers connected to respective one of said storage capacitance lines.

BRIEF DESCRIPTION OF THE DRAWINGS

The present invention will be explained with the following drawings in which.

DETAILED DESCRIPTION OF THE PREFERRED EMBODIMENTS

First Embodiment

Figure 1:
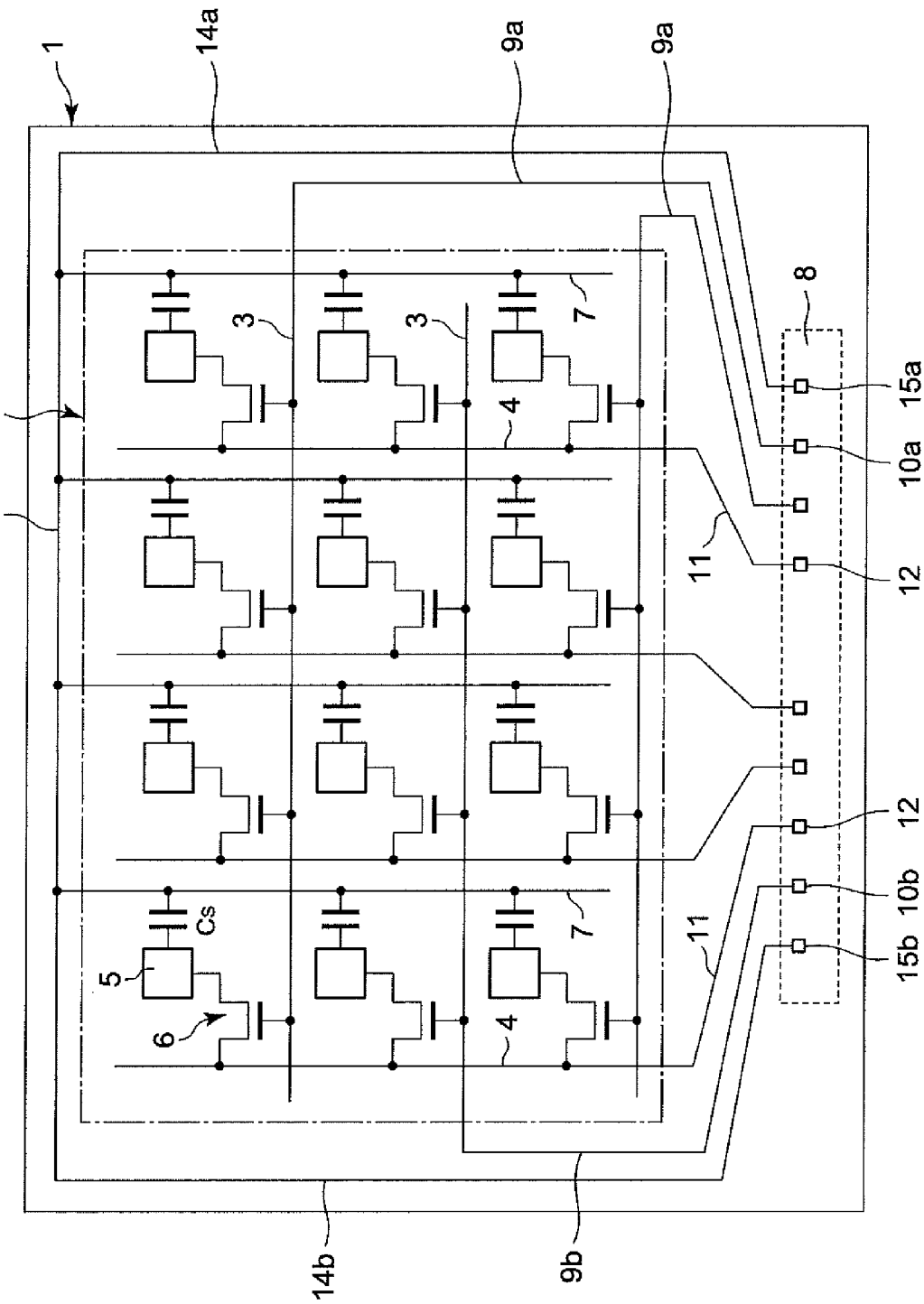
FIG. 1 is a plan view of a liquid crystal display device as a first embodiment of the present invention in which the device is illustrated generally in an equivalent circuit as formed on an active substrate and in part omitted.

FIG. 1 shows a plan view of a liquid crystal display device according to a first embodiment of the present invention in which the device is illustrated generally in an equivalent circuit as formed on an active substrate and in part omitted. In the active substrate 1, a square display area 2 shown in alternate long and short dash lines is provided with a plurality of scanning lines 3 and a plurality of data lines 4 in the form of a matrix. In this case, the scanning lines 3 are each arranged to extend in a row and the data lines 4 are each arranged to extend in a column.

In the display area 2 on the active substrate 1, a region surrounded with adjacent scanning lines 3 and adjacent data lines 4 is provided therein with a pixel electrode 5. The pixel electrode 5 is connected to a scanning line 3 and a data line 4 via a thin film transistor 6 as a switching element. In the display area 2 on the active substrate 1, a plurality of storage capacitance lines 7 are arranged each to extend in a row. An storage capacitance line 7 forms an storage capacitance Cs with a pixel electrode 5. An area shown in dashed lines below the display area 2 on the active substrate 1 constitutes a driver mounting area 8.

The scanning line 3 in the row of an odd number counted from the bottom is connected at its right hand end via interconnection wire 9a to a connecting pad 10a, where the interconnection wire 9a is arranged leading downwards out of the right hand side of the display area 2 and the connecting pad 10a is provided in the driver mounting area 8. The left end of the scanning line 3 in the row of an even number counted from the bottom is connected via interconnection wire 9b leading downwards out of the left side of the display area 2 to a connecting pad 10b provided in the driver mounting area 8. The lower end of a data line 4 is connected via interconnection wire 11, where the interconnection wire 11 is arranged on the down side to a connecting pad 12 provided in the driver mounting area 8.

The upper end of a storage capacitance line 7 is connected to a common interconnection wire 13 provided on the upper side of the display area 2. The right end of the common interconnection wire 13 is connected via a common interconnection wire 14a extending from the right to lower side of the display area 2 to a connecting pad 16a provided in the driver mounting area 8. The left end of the common interconnection wire 13 is connected via a common interconnection wire 14b extending from the left to lower side of the display area 2 to a connecting pad 15b provided in the driver mounting area 8.

Figure 2:
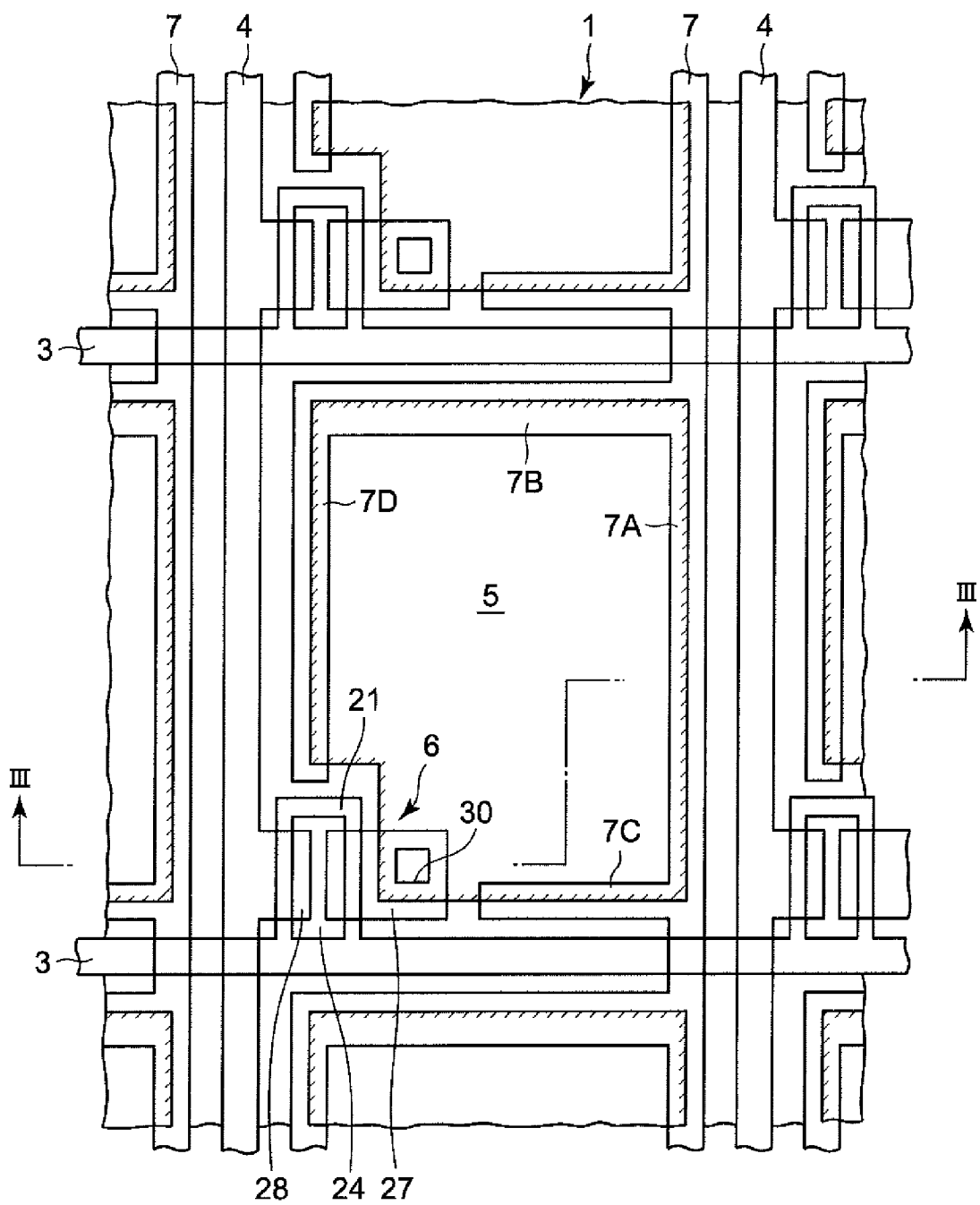
FIG. 2 is a transparent plan view of a portion of the active substrate shown in FIG. 1.
Figure 3:
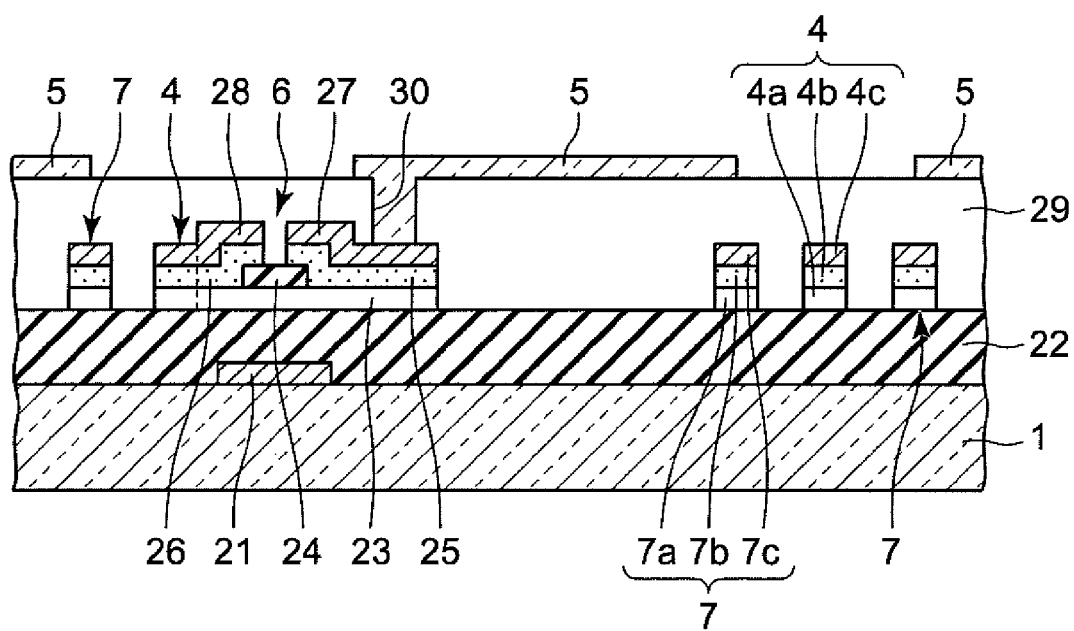
FIG. 3 is a cross sectional view taken along the line III-III in FIG. 2.

Mention is next made of a specific structure of a part of the liquid crystal display device. FIG. 2 is a transparent plan view of a portion of the active substrate 1 shown in FIG. 1. FIG. 3 is a cross sectional view taken along the line III-III in FIG. 2. For the purpose of improving clarity of drawing, the boundary of a pixel electrode 5 is indicated by hatching with short oblique lines in FIG. 2 (the same applies to other Figures).

The active substrate 1 is provided at a predetermined region of its upper surface with gate electrodes 21 composed of chromium or the like and scanning lines 3 connected to the gate electrodes 21. The active substrate 1 having such gate electrodes 21 and scanning lines 3 is provided on its upper surface with a gate insulating film 22 composed of silicon nitride or the like.

The gate insulating film 22 is disposed to cover the gate electrode 21 provided at a predetermined region of active substrate 1. A semiconductor thin film 23 composed of intrinsic amorphous silicon is provided on the gate insulating film 22 at the corresponding region of the gate electrode 21. The semiconductor thin film 23 above the gate electrode 21 is provided at a predetermined region with a channel protective film 24 composed of silicon nitride, for example. Ohmic contact layers 25 and 26 composed of n-type amorphous silicon are disposed to cover the side regions of the channel protective film 24 and on the upper surface of the semiconductor thin film 23 at the respective sides of the channel protective film 24. The ohmic contact layers 25 and 26 have a source electrode 27 and a drain electrode 28 formed thereon, respectively.

Therefore, the gate electrode 21, the gate insulating film 22, the semiconductor thin film 23, the channel protective film 24, the ohmic contact layers 25 and 26, the source electrode 27 and the drain electrode 28 make up the thin film transistor 6.

The data lines 4 are provided at a predetermined region on the gate insulating film 22. In this case, the data line 4 is formed of a three-layer structure of an intrinsic amorphous silicon layer 4a, an n-type amorphous silicon layer 4b and a layer of metal 4c such as chromium or the like arranged in that order from the bottom. The intrinsic amorphous silicon layer 4a, the n-type amorphous silicon layer 4a and the metal layer 4c are connected to the semiconductor thin film 23, the ohmic contact layer 26 and the drain electrode 28, respectively, in the region in which the drain electrode 28 is formed.

The storage capacitance lines 7 are provided at a separate predetermined region on the gate insulating film 22. In this example, the storage capacitance line 7 is composed of materials that are the same as those of the data line 4 and is formed of a three-layer structure of an intrinsic amorphous silicon layer 7a, an n-type amorphous silicon layer 7b and a layer of metal 7c such as chromium or the like. Mention will be made later of a planar configuration of the storage capacitance line 7.

The upper side of the gate insulating film 22 which in part makes up the thin film transistor 6, the data line 4 and the storage capacitance line 7 is covered with an interlayer insulating film 29 made of silicon nitride or the like, for example. A contact hole 30 is formed in the interlayer insulating film 29 at a position corresponding to a predetermined region of the source electrode 27. Pixel electrodes 5 composed of a transparent electrically conductive material, such as ITO, are provided at a predetermined area of the upper surface of the interlayer insulating film 29. The pixel electrode 5 is connected to the source electrode 27 via the contact hole 30.

Here, as shown in FIG. 2, in this example, the lower left corner of the pixel electrode 5 is cut out and the gate electrode 21 of the thin film transistor 6 is arranged therein. The gate electrode 21 of the thin film transistor 6 is connected to a scanning line 3 arranged in the underside of the pixel electrode 5. The drain electrode 28 of the thin film transistor 6 is connected to a data line 4 arranged on the left side of the pixel electrode 5.

Referring to FIG. 2, the storage capacitance line 7 comprises a common electrode portion 7A disposed parallel to the data line 4 at a position corresponding to the right side of the pixel electrode 5, upper and lower extracted electrode portions 7B and 7C extracted out of the common electrode portion 7A along the upper and lower sides of the pixel electrode 5, respectively, and an extracted electrode portion 7D extracted out of an end of the upper extracted electrode portion 7B along the left side of the pixel electrode 5.

The left side of the common electrode portion 7A, which is a part corresponding to the pixel electrode 5, overlaps with the right side of the pixel electrode 5. The lower side of the upper extracted electrode portion 7B overlaps with the upper side of the pixel electrode 5. The upper side of the lower extracted electrode portion 7C overlaps with the lower side of the pixel electrode 5. The right side of the left extracted electrode portion 7D overlaps with the left side of the pixel electrode 5. These overlapping parts constitute a storage capacitance Cs.

Referring to FIG. 1, the interconnection wires 9a and 9b connected to scanning lines 3 are formed of the same material as that of the scanning lines 3 and are disposed on the same plane as the scanning lines 3. (on the upper surface of the active substrate 1). Therefore the interconnection wires 9a and 9b do not cross or intersect with any wiring on this plane. The interconnection wire 11 connected to a data line 4 is formed of the same materials as those of the data line 4. That is, it is made of a three-layer structure of an intrinsic amorphous silicon layer 4a, a n-type amorphous silicon layer 4b and a layer 4c of metal such as chromium in that order from the side of the active substrate 1. The interconnection wire 11 is formed on the same plane as the data lines 4 (on the upper surface of the gate insulating film 22), and does not cross or intersect with any wiring on this plane. Common interconnection wires 13, 14a, 14b connected to storage capacitance lines 7 are formed of the same materials as those of the storage capacitance lines 7. Specifically, they are formed of a three-layer structure of an intrinsic amorphous silicon layer 7a, an n-type amorphous silicon layer 7b and a layer 7c of metal such as chromium, which are disposed in that order from the side of the active substrate 1. Therefore, the common interconnection wires 13, 14a, 14b are formed on the same plane as the storage capacitance lines 7 (on the upper surface of the gate insulating film 22), and does not cross or intersect with any wiring on this plane.

Although not shown in figures, a common substrate having a common electrode is disposed on the upper side of the active substrate 1, and a liquid crystal as a display element is disposed between the pixel electrode 5 on the active substrate 1 and the common electrode to makeup a liquid crystal display device.

As mentioned above, in this liquid crystal display device, because the storage capacitance lines 7 are arranged on the same plane as the data lines 4 (on the upper surface of the gate insulating film 22) in parallel with the data lines 4, the storage capacitance lines 7 do not overlap with the data lines 4.

Accordingly, a parasitic capacitance due to such an overlap is avoided, thereby making it possible to reduce the power consumption at the data lines.

The storage capacitance lines 7 overlap with scanning lines 3, which are disposed on a plane that is different from the plane on which the storage capacitance lines 7 are disposed (on the upper surface of the active substrate 1). Thus, a parasitic capacitance is generated where the storage capacitance lines 7 and the scanning lines 3 overlap with each other, thereby causing increased power consumption at scanning lines.

However, the power consumption at data lines 4 as mentioned before is much larger than that at scanning lines 3. Thus, by subtracting the amount of the increase in the power consumption due to a parasitic capacitance at places where the scanning lines 3 and the storage capacitance lines 7 overlap from the amount of the decrease in the power consumption due to the elimination of the parasitic capacitance between the data lines 4 and the storage capacitance lines 7, the total reduction in the power consumption can be arrived.

Also, in this example of liquid crystal display device, since the storage capacitance lines 7 are disposed on the gate insulating film 22, the vertical spacing between the storage capacitance lines 7 and the pixel electrodes 5 can be reduced as compared with situations where it is disposed on the same plane as the scanning lines 3 (on the upper surface of the active substrate 1). It is thus possible to increase the capacitance per unit area between the storage capacitance line 7 and the pixel electrode 5 and to reduce the area of the overlap necessary to achieve a required storage capacitance, thereby increasing the aperture ratio.

Second Embodiment

Figure 4:
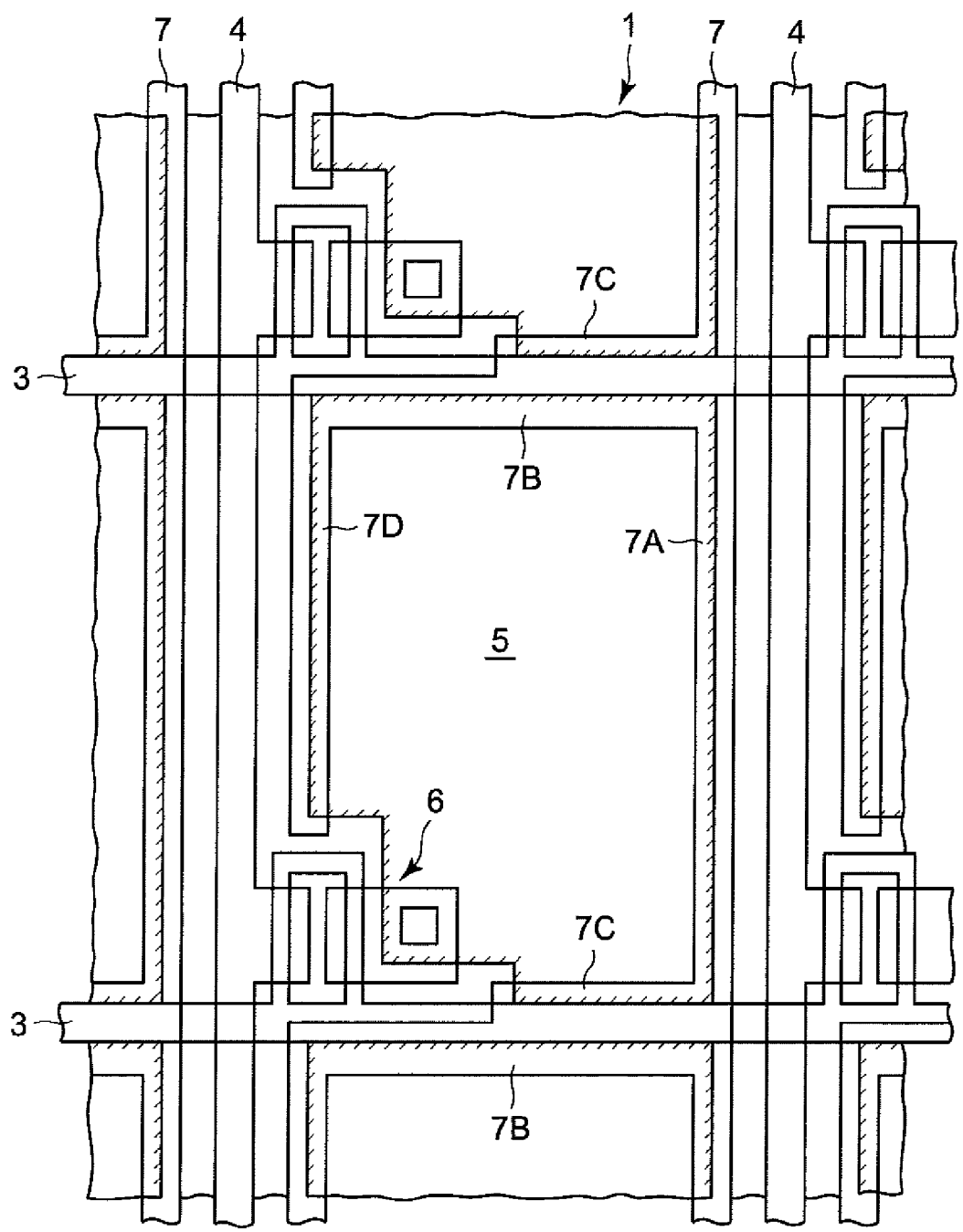
FIG. 4 is a transparent plan view, as in FIG. 2, of a liquid crystal display device according to a second embodiment of the present invention.

FIG. 4 is a transparent plan view, as in FIG. 2, of a liquid crystal display device according to a second embodiment of the present invention. This liquid crystal display device differs from the liquid crystal display device shown in FIG. 2 in that the upper extracted electrode portion 7B of the storage capacitance line 7 has its upper side overlapping with the lower half of the scanning line 3 disposed at the upper side of the pixel electrode 5; and the lower extracted electrode portion 7C has its lower side overlapping with the upper half of the scanning line 3 disposed on the lower side of the pixel electrode 5. Further, the upper side edge of the pixel electrode 5 is substantially aligned with the lower side edge of the scanning line 3 that is located on the upper side of the pixel electrode 5, and the lower side edge of the pixel electrode 5 is substantially aligned with the upper side edge of the scanning line 3 that is located on the lower side of the pixel electrode 5.

In this example, the upper and lower extracted electrode portions 7B and 7C adjacent to each other are connected together at the widthwise center of the scanning line 3. Therefore, the upper and lower extracted electrode portions 7B and 7C adjacent to each other and connected together covers a portion of the scanning line 3 and its widthwise both sides, allowing them to be completely shielded of the light and also preventing a parasitic capacitance from developing between the scanning line 3 and the pixel electrode 5. In addition, since the upper side edge of the pixel electrode 5 is substantially aligned with the lower side edge of the scanning line 3 located on the upper side of the pixel electrode 5, and because the lower side edge of the pixel electrode 5 is substantially aligned with the upper side edge of the scanning lines 3 located on the lower side of the pixel electrode 5, the aperture ratio is increased.

Third Embodiment

Figure 5:
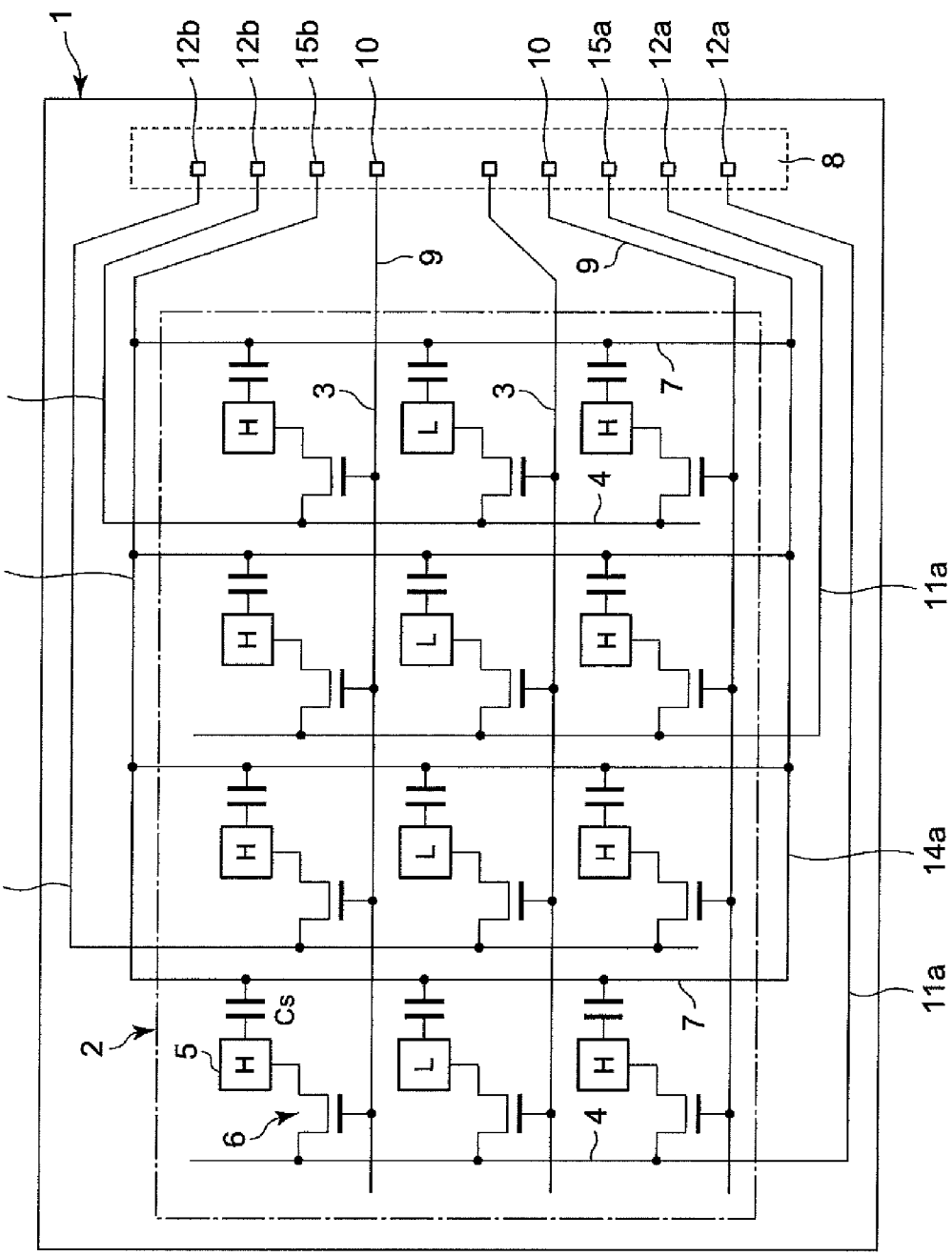
FIG. 5 is a plan view, generally shown in an equivalent circuit as in FIG. 1, of a liquid crystal display device according to a third embodiment of the present invention.

FIG. 5 is a plan view, generally showing an equivalent circuit, as in FIG. 1, of a liquid crystal display device according to a third embodiment of the present invention. This liquid crystal display device differs from the liquid crystal display device shown in FIG. 1 in that the driver mounting area 8 is arranged at the right side of the display area 2. In this case, the right side end of the scanning line 3 is connected via an interconnection wire 9 provided on the right side of the display area 2 to a connecting pad 10 provided in the driver mounting area 8.

The lower end of the data line 4 of an odd number column counted from the left side is connected via an interconnection wire 11a led out of the lower side of the display area 2 rightwards to a connecting pad 12a provided in the driver mounting area 8. The upper end of the data line 4 of an even number column counted from the left side is connected via an interconnection wire 11b led out of the upper side of the display area 2 rightwards to a connecting pad 12b provided in the driver mounting area 8.

The lower end of the storage capacitance line 7 is connected via a common lead-round wire 14a led out of the lower side of the display area 2 rightwards to a connecting pad 16a provided in the driver mounting area 8. The upper end of the storage capacitance line 7 is connected via a common lead-round wire 14b led out of the upper side of the display area 2 rightwards to a connecting pad 15b provided in the driver mounting area 8.

The interconnection wire 9 connected to the scanning line 3 is formed on the same plane as the scanning line 3, (on the upper surface of the active substrate 1), and does not overlap with any wiring on this plane. The interconnection wires 11a, 11b connected to the data line 4 are formed on of the same plane as the data line 4 (on the upper surface of the gate insulating film 22), and overlaps with the common interconnection wire 14a, 14b connected to the storage capacitance line 7 at the outside of the display area 2. Because of this, the common interconnection wire 14a and 14b are formed on the same plane as the scanning line 3 (on the upper surface of the active substrate 1), and are connected, though not shown, via contact holes formed in the gate insulating film 22 to both ends of the storage capacitance lines 7, respectively.

Figure 6:
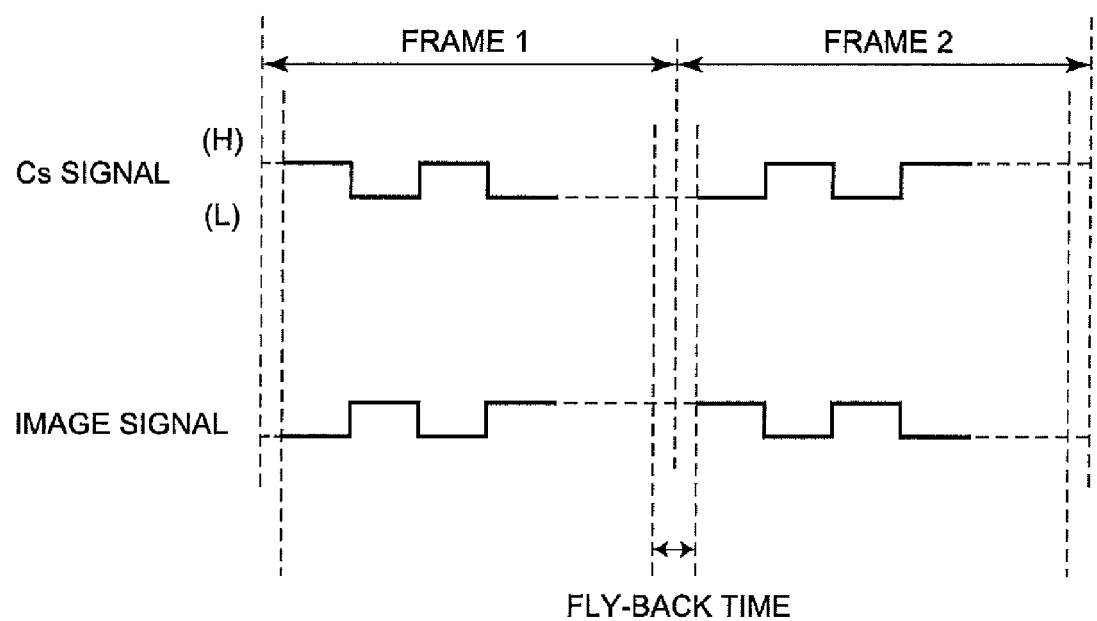
FIG. 6 is a timing diagram for explanation of a method of driving the liquid crystal display device shown in FIG. 5.

Referring to FIG. 6, mention is next made of a method of driving this liquid crystal display device by line inversion driving. In this driving method, scanning lines 3, as shown in FIG. 5, are successively selected one by one from the lower side to perform scanning operation, and for every such selection of these scanning line, the potential of an storage capacitance signal Cs that is applied to the storage capacitance lines 7 is inverted to yield H, L, H, L, . . . and the phase of an image signal supplied to data lines 4 is switched in synchronization with this timing.

For example, when the lowermost scanning line 3 is selected, high potential H is applied to all the storage capacitance lines 7 and an inverted image signal is supplied to all the data lines 4. Next, when the second scanning line 3 from the bottom is selected, low potential L is applied to all the storage capacitance lines 7 and a non-inverted image signal is supplied to all the data lines 4. In the steps that follow, the phase of the Cs signal applied to all the storage capacitance lines 7 and the phase of the image signal supplied to all the data lines 4 are alternated in synchronization with the selection timing of the scanning line 3. Then, when the writing has been completed for one frame, the potentials at pixels in the odd numbered rows, as counted from the bottom, are H, and the potentials at pixels in the even numbered rows are L, as shown in FIG. 5. This amounts to the H (horizontal) line inversion driving. For the next frame, though not described in detail, the polarities of the signal Cs and the image signal that are supplied to respective pixels are reversed in polarity as compared with the signals described above.

Fourth Embodiment

Figure 7:
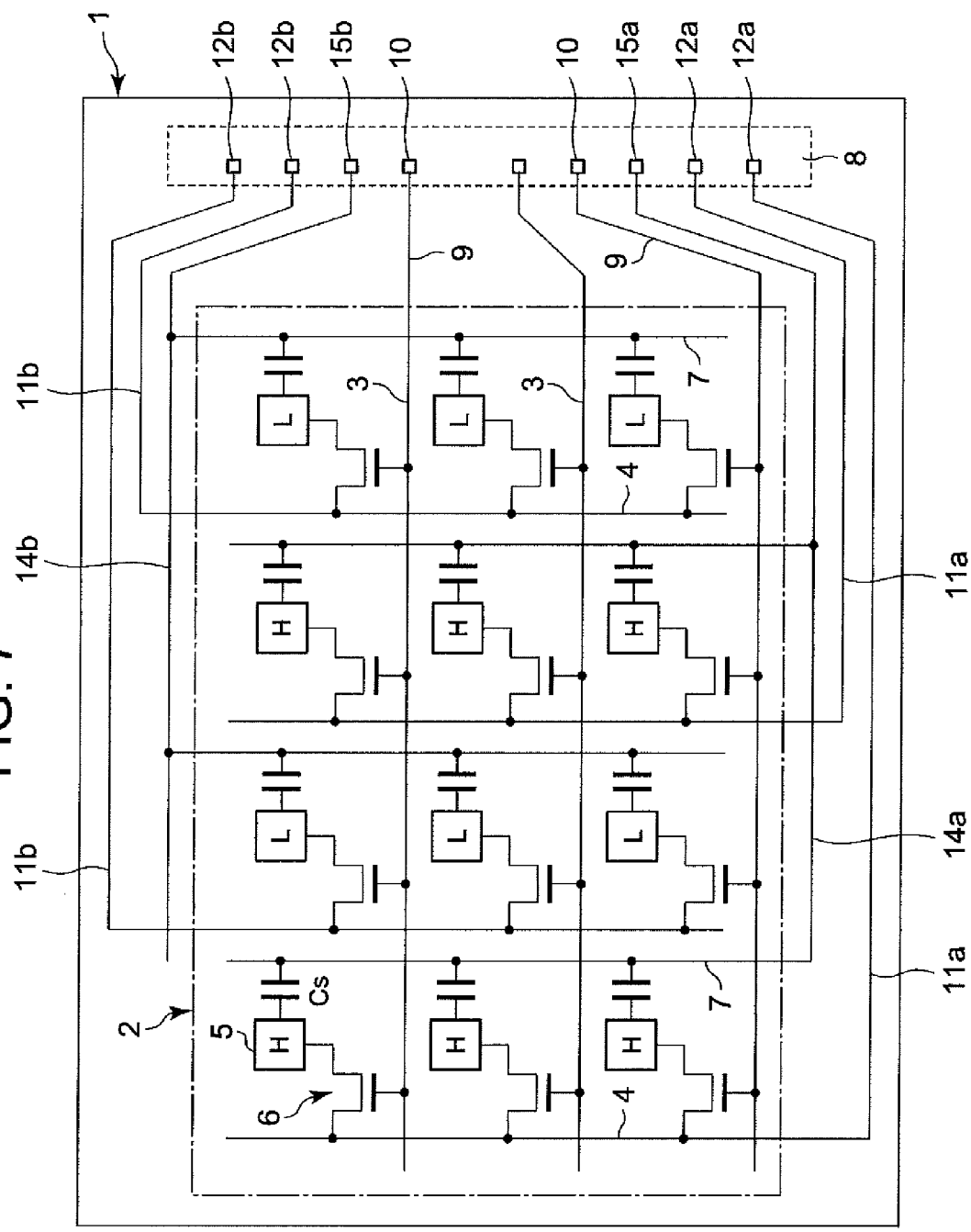
FIG. 7 is a plan view, generally shown in an equivalent circuit as in FIG. 5, of a liquid crystal display device according to a fourth embodiment of the present invention.

FIG. 7 is a plan view, generally showing an equivalent circuit, as in FIG. 5, of a liquid crystal display device according to a fourth embodiment of the present invention. This liquid crystal display device differs from the liquid crystal display device shown in FIG. 5 in that the lower side ends of the storage capacitance lines 7 in the odd numbered columns, as counted from the left side, are connected via a common interconnection wire 14a led out of the lower side of the display area 2 rightwards to a connecting pad 16a provided in the driver mounting area 8 and that the upper ends of the storage capacitance line 7 in the even numbered columns are connected via a common interconnection wire 14b led out of the upper side of the display area 2 rightwards to a connecting pad 15b provided in the driver mounting area 8.

The data line 4 and the storage capacitance line 7 in the odd numbered column counted from the left side are connected via the interconnection wires 11a and 14a provided in the lower side of the display area 2 to the connecting pads 12a and 16a provided in the driver mounting area 8, respectively. The data line 4 and the storage capacitance line 7 in the even numbered column counted from the left side are connected via the interconnection wires 11b and 14b provided in the upper side of the display area 2 to the connecting pads 12b and 15b in the driver mounting area 8, respectively. In other words, the data lines 4 and the storage capacitance lines 7 are alternately connected to the interconnection lines 11a and 11b and the interconnection lines 14a and 14b, respectively.

Figure 8:
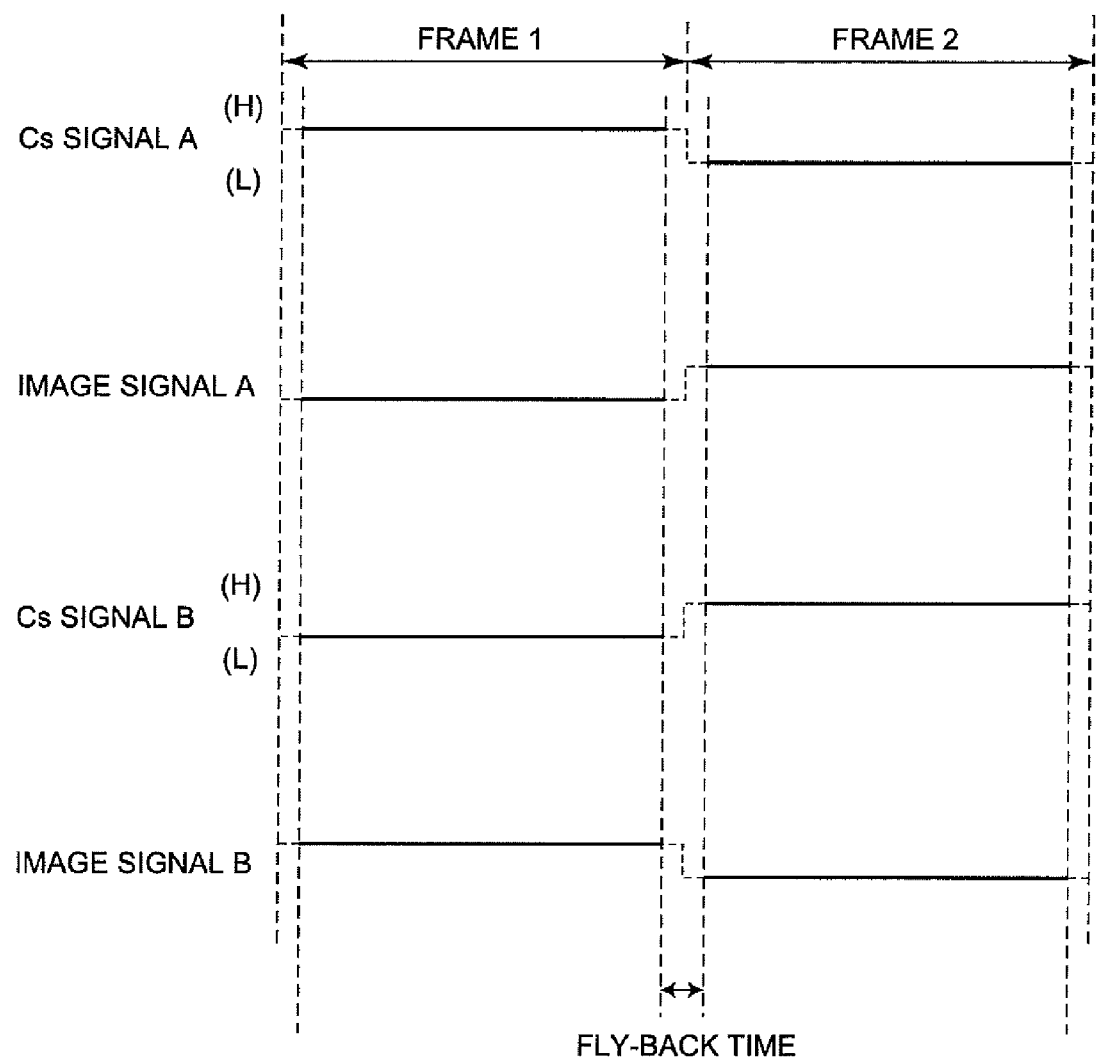
FIG. 8 is a timing diagram for explanation of a method of driving the liquid crystal display device shown in FIG. 5.

Referring to FIG. 8, mention is next made of a method of driving this liquid crystal display device by line inversion driving. In the driving method in this case, scanning lines 3 are successively selected one by one from the lower side to perform scanning operation, and for every selection of scanning line 3, the signal Cs supplied to the storage capacitance line 7 in odd numbered columns, as counted from the left side in FIG. 7, and the signal Cs applied to the storage capacitance line in even numbered columns, as counted from the left side in FIG. 7, are inverted in their phases while the image signal applied to the data lines 4 in odd numbered columns and the image signal applied to the data lines 4 in even numbered columns are also inverted in their phase, corresponding to the polarities of the Cs signals.

For example, in the first frame, when the lowermost scanning line 3 is selected, high potential H is applied to the storage capacitance lines 7 in odd numbered columns, and an inverted image signal is applied to the data lines 4 in the odd numbered columns. Low potential L is applied to the storage capacitance lines 7 in even numbered columns and a non-inverted image signal is applied to the data lines 4 in even number columns. In the steps that follow, every time a scanning line 3 is selected, the high potential H is applied to the storage capacitance lines 7 in odd numbered columns and an inverted image signal is applied to the data lines 4 in odd numbered columns, and low potential L is applied to the storage capacitance lines 7 in even numbered columns and a non-inverted image signal is applied to the data lines 4 in even numbered columns. Then, when the writing has been completed for one frame, as shown in FIG. 8, the potentials at pixels in the odd numbered columns and the potentials at pixels in the even numbered columns are H and L, respectively. Thus amounts to V (vertical line) inversion driving. For the next frame, the signal Cs and the image signals applied to the respective pixels are reversed in polarity as compared with the signals described above.

In this case, as the Cs signals A, B are inverted on a frame by frame basis, the driving can be said to be a frame inversion driving. Consequently, this driving method makes it possible to obtain a display of line inversion with a Cs signal of frame invention. In this case, the power consumption of the storage capacitance lines 7 can be largely reduced while maintaining the power consumption for the data lines 4 equal to that in the normal line inversion and the power consumption of the system on the whole can be reduced while maintaining the display quality of the line inversion.

It is also possible to drive the Cs signals A and B in synchronization with the frequency of scanning lines 3 to perform a dot inversion driving. In this case, the voltage amplitude on the data lines 4 can be an amplitude corresponding to the line inversion. Therefore, the amplitude can be reduced by half as compared with cases of normal dot inversion driving (in which the Cs signal is a DC voltage and the voltage amplitude on the data lines 4 is twice as large as that of voltage VLCD applied to the liquid crystal).

Fifth Embodiment

Figure 9:
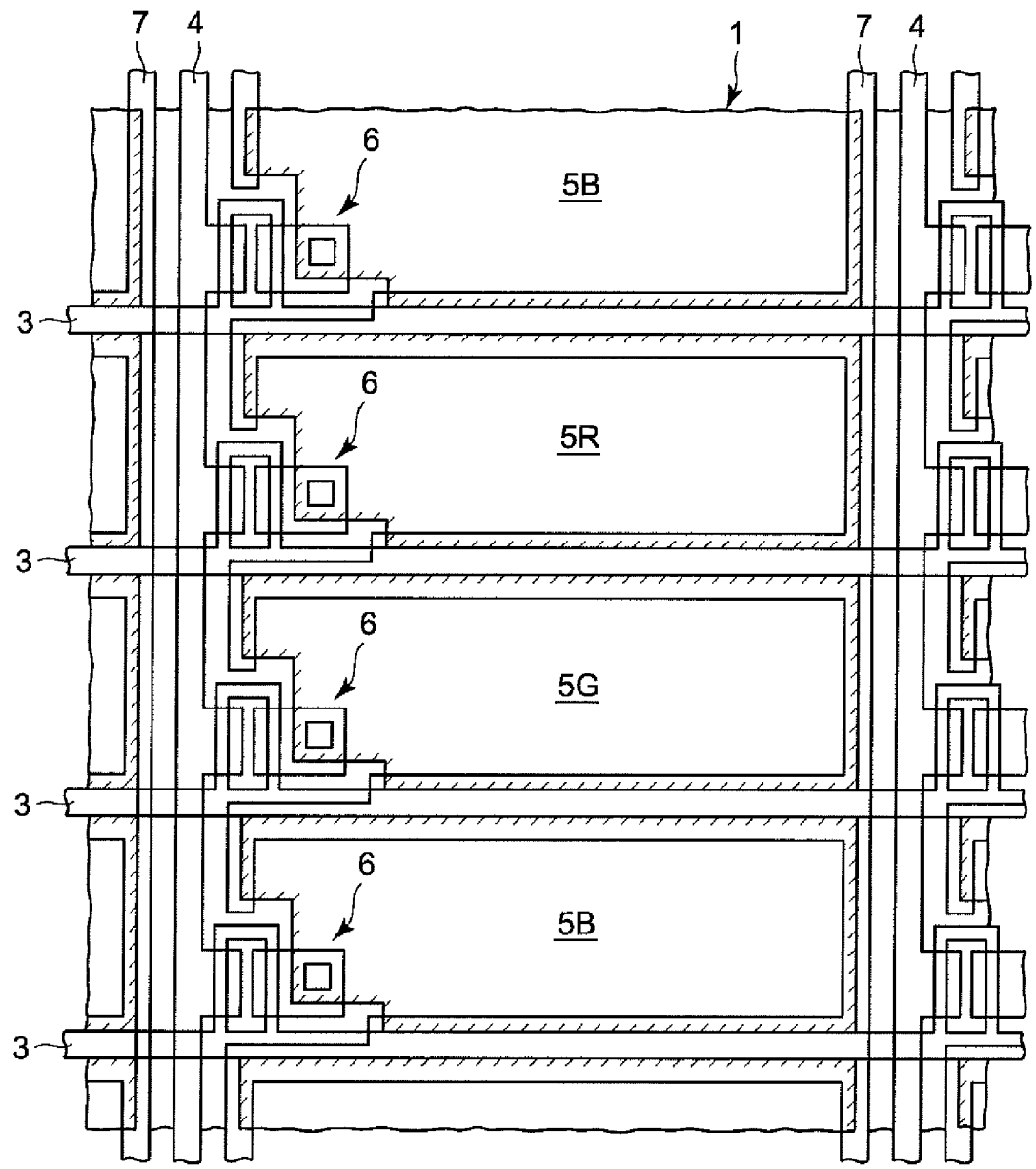
FIG. 9 is a transparent plan view, as in FIG. 4, of a liquid crystal display device according to a fifth embodiment of the present invention.

FIG. 9 is a transparent plan view, as in FIG. 4, of a liquid crystal display device according to a fifth embodiment of the present invention. This figure differs from the liquid crystal display device of FIG. 4 in that it shows aspects of a color liquid crystal display device. In this example, pixel electrodes 5R, 5G and 5B for color display of R (red), G (green) and B (blue) are disposed in the form of a stripe along a data line 4. Also, the pixel electrodes 5R, 5G and 5B each have an elongated shape—that is, the length along the scanning line 3 is longer than the length along the data line 4.

In this case, because three pixel electrodes 5R, 5G and 5B arranged consecutively along the data line 4 constitute one pixel that has a substantially square shape, three scanning lines 3 and one data line 4 are required for the one pixel. In contradistinction thereto, though not shown, when three pixel electrodes are consecutively arranged along a scanning line 3 to constitute one pixel having a substantially square shape, one scanning line 3 and three data lines 4 are required for the one pixel.

In the present embodiment, the driving load for a scanning line 3 is increased by three times, but since no parasitic capacitance due to crossing storage capacitance line 7 and data line 3 is created and the number of data lines 4 can be reduced to ⅓, the power consumption of the system on the whole can be reduced. Also, in the construction that the driver mounting area 8 is located at the right hand side of the display area 2 as shown in FIG. 5 and FIG. 7, since the number of data lines 4 can be reduced to ⅓, it is possible to reduce the width of the area for the interconnection wires 11a and 11b, thereby making it possible to reduce the peripheral area. This liquid crystal display device can also be driven by a driving method as described in connection with FIG. 8.

In addition, it is also possible that three pixel electrodes consecutively arranged along the data line 4 may constitute one pixel consisting of Y (yellow), M (magenta) and C (cyan). It is also possible that four electrodes consecutively arranged along the data line 4 may constitute one pixel consisting of R, G, B and W (white) or Y, M, C and W. In this case, the number of scanning lines needs to be increased to accommodate color display.

Sixth Embodiment

Figure 10:
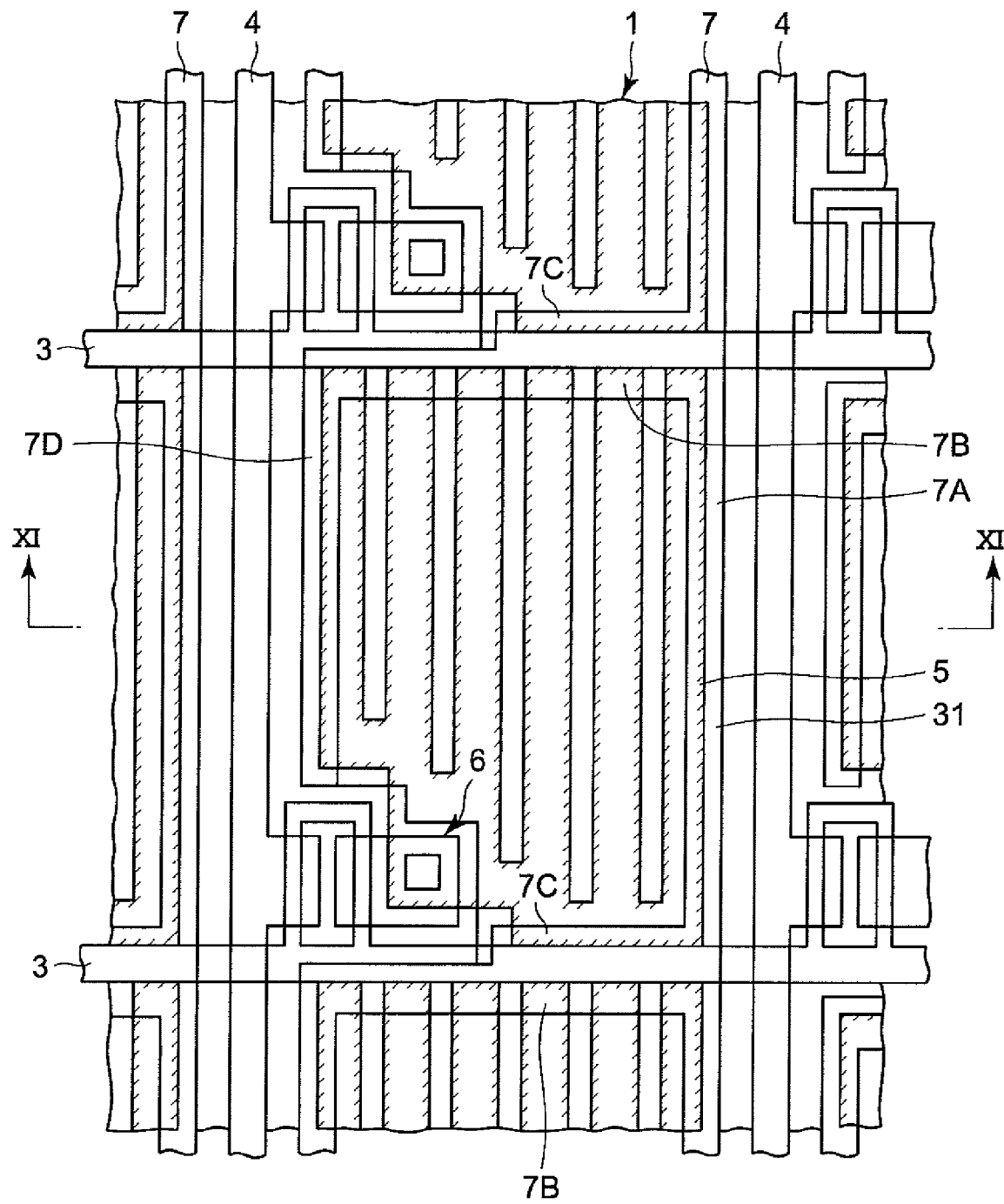
FIG. 10 is a transparent plan view, as in FIG. 4, of a liquid crystal display device according to a sixth embodiment of the present invention.
Figure 11:
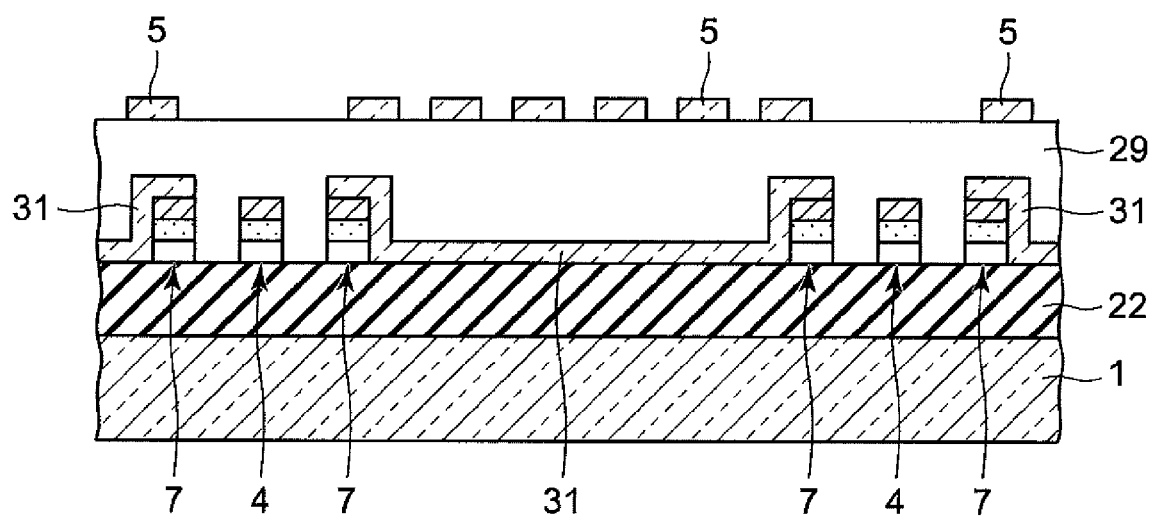
FIG. 11 is a cross sectional view taken along the line XI-XI in FIG. 10.

FIG. 10 is a perspective plan view, as in FIG. 4, of a liquid crystal display device according to a sixth embodiment of the present invention and FIG. 11 is a cross sectional view taken along the line XI-XI in FIG. 10. This differs from the liquid crystal display device of FIG. 2 in that it is of the FFS (Fringe Field Switch) structure which is a type of transverse electric field mode liquid crystal display device.

In this case, an storage capacitance electrode layer 31 having a stepped shape and made of a transparent electrically conductive material such as ITO is formed on storage capacitance lines 7 and on the gate insulating film 22 in an area substantially surrounded with electrode portions 7A, 7B, 7C and 7D of the storage capacitance lines 7. A pixel electrode 5 to which the source electrode of a thin film transistor 6 is connected has an interdigital structure in this embodiment. A storage capacitance is formed by an interlayer insulating film 29 formed between the storage capacitance electrode layer 31 and the pixel electrode 5. Also it goes without saying that this liquid crystal display device may also be driven by a driving method as described in connection with FIG. 7.

While the pixel electrode 5 has an interdigital structure shown in FIG. 10 and FIG. 11, the pixel electrode 5 may be flat and the storage capacitance electrode layer 31 may have an interdigital structure. Alternatively, both the pixel electrode 5 and the storage capacitance electrode layer 31 may have interdigital structures. It follows, therefore, that at least one of the pixel electrode 5 and the storage capacitance layer 31 may have an interdigital structure.

Other Embodiments

In the liquid crystal display device shown in FIG. 5, one of the two interconnection wires 14a and 14b connected to the storage capacitance line 7 may be omitted. Also, in the embodiments described above, although the invention has been described as applied to a liquid crystal display device, the present invention can be applied to other display devices such as of organic EL.

As described above, according to one aspect of the present invention, since the storage capacitance lines are arranged on the same plane as the data lines in parallel with the data lines, the storage capacitance lines do not significantly overlap with the data line, thereby substantially eliminating a parasitic capacitance due to such an overlap, and thereby making it possible to reduce the power consumption at the data lines.

What is claimed is:

1. A display device comprising:
   a substrate having a display area;
   a plurality of scanning lines and a plurality of data lines, arranged in the display area over the substrate, wherein the data lines extend substantially orthogonally to the scanning lines;
   a plurality of switching elements each connected to respective one of the scanning lines and to respective one of the data lines, each of the switching elements being a thin film transistor having a semiconductor thin film, an ohmic contact layer, a source electrode and a drain electrode;
   a plurality of pixel electrodes each connected to respective one of the switching elements; and
   a plurality of storage capacitance lines disposed substantially in parallel with the data lines, each of the storage capacitance lines having a portion overlapping with a portion of the pixel electrode, the storage capacitance lines being disposed on a plane on which the data lines are disposed and being made of the same material as the data lines, each of the storage capacitance lines including a member formed of a material that is the same as that of the ohmic contact layer.

2. The display device as set forth in claim 1, further comprising a connecting pad, and a common interconnection wire connecting the connecting pad and the storage capacitance lines.

3. The display device as set forth in claim 2, further comprising
a plurality of second connecting pads;
a plurality of second interconnection wires connecting the scanning lines to the second connecting pads, respectively; and
an insulating film provided between each the second interconnection wires and the storage capacitance line, wherein
each of the storage capacitance line is connected to the common interconnection wire via contact holes with which the insulating film is formed.

4. The display device as set forth in claim 1, further comprising:
an insulating film formed on the scanning line over the substrate; and
an interlayer insulating film formed over the storage capacitance lines and on the insulating film,
wherein the pixel electrodes are formed on the interlayer insulating film, and
wherein each of the storage capacitance lines has an extracted electrode portion that overlaps with a side of a pixel electrode adjacent thereto and that covers a portion of an adjacent scanning line.

5. The display device as set forth in claim 1, further comprising
a first common interconnection wire disposed on one side of the substrate at an outside of the display area and connected to one ends of the storage capacitance lines, and
a second common interconnection wire disposed on a side opposed to the one side of the substrate at an outside of the display area and connected to the other ends of the storage capacitance lines.

6. The display device as set forth in claim 1, in which three such pixel electrodes, for R, G and B or for Y, M and C, respectively arranged consecutively along the data line, constitute one pixel.

7. The display device as set forth in claim 6, wherein each of the pixel electrodes has a shape of a stripe along the scanning line and has a length along the scanning line longer than a length along the data line.

8. The display device as set forth in claim 1 wherein four such pixel electrodes, for R, G, B and W or for Y, M, C and W, respectively arranged consecutively along the data line, constitute one pixel.

9. The display device as set forth in claim 8, wherein each of the pixel electrodes has a shape of a stripe along the scanning line and has a length along the scanning line longer than a length along the data line.

10. The display device as set forth in claim 1, wherein each of the storage capacitance lines includes a member formed of a material same as that of the semiconductor thin film.

11. The display device as set forth in claim 1, further comprising a connecting pad; and a common interconnection wire connecting the connecting pad and the storage capacitance lines, the common interconnection wire including a material that is the same as that of the semiconductor thin film.

12. The display device as set forth in claim 1, further comprising a plurality of storage capacitance electrodes, each of which is composed of a transparent conductive material arranged opposite to a pixel electrode and is connected to storage capacitance lines.

13. The display device as set forth in claim 12, wherein at least one of the pixel electrode and the storage capacitance electrode has an interdigital structure.

14. The display device as set forth in claim 13, wherein the storage capacitance electrode has an interdigital structure.

15. A display device comprising:
a substrate having a display area;
a plurality of scanning lines and a plurality of data lines arranged in the display area over the substrate, wherein the data lines extend substantially orthogonally to the scanning lines;
a plurality of thin film transistors, each of which has a semiconductor thin film, an ohmic contact layer, a gate electrode connected to respective one of the scanning lines, a gate insulating film, a source electrode and a drain electrode connected to respective one of the data lines;
a plurality of pixel electrodes connected to the thin film transistors, respectively;
a display element disposed over each of the pixel electrodes; and
a plurality of storage capacitance lines formed parallel to the data lines, wherein the data lines and the storage capacitance lines are formed on the gate insulating film, each of the storage capacitance lines has a portion overlapping with at least a portion of the pixel electrodes and includes a layer of metal formed of a material that is the same as that of the data lines, and each of the storage capacitance lines includes a member formed of a material that is the same as that of the ohmic contact layer.

16. The display device as set forth in claim 15, further comprising a plurality of connecting pads connected to the gate electrodes, the data lines, and the storage capacitance lines, respectively, wherein the plurality of connecting pads are formed in a driver mounting area disposed parallel to the storage capacitance lines.

17. The display device as set forth in claim 15, further comprising a first interconnection wire connected to odd numbered storage capacitance lines, as counted from one end; and a second interconnection wire connected to even numbered storage capacitance lines, as counted from the one end.

18. The display device as set forth in claim 17, further comprising a plurality of first data interconnection wires connected to odd numbered data lines, respectively, as counted from one end; and a plurality of second interconnection wires connected to even numbered data lines, respectively as counted from the one end.

19. A display device comprising:
a substrate having a display area;
a plurality of scanning lines and a plurality of data lines, arranged in the display area over the substrate, wherein the data lines extend substantially orthogonally to the scanning lines;
a plurality of thin film transistors, each of which has a semiconductor thin film, an ohmic contact layer, a gate electrode connected to respective one of the scanning lines, a gate insulating film, a source electrode and a drain electrode connected to respective one of the data lines;
a plurality of pixel electrodes connected to respective one of the thin film transistors;

a display element arranged as opposed to the pixel electrodes;

a plurality of storage capacitance lines formed parallel to the data lines, each of the storage capacitance lines including a member formed of a material that is the same as that of the ohmic contact layer; and storage capacitance electrode layers arranged opposite to the pixel electrodes, each of the storage capacitance electrode layers connected to respective one of the storage capacitance lines.

20. The display device as set forth in claim 19 wherein each of the storage capacitance lines includes a layer of metal formed on a plane on which the data lines are formed, and is made of a material that is the same as that of the data lines.

21. The display device as set forth in claim 19 wherein each of the storage capacitance electrode layer is formed of a transparent conductive material.

22. The display device as set forth in claim 19 wherein at least either of the pixel electrode or the storage capacitance electrodes layer has an interdigital structure.

23. A display device comprising:

a scanning line having a metal layer which is formed as a first layer;

a data line having an n-type amorphous silicon layer which is formed as a second layer, the second layer being different form the first layer;

a thin film transistor having a drain electrode, a source electrode, a gate electrode and an ohmic contact layer, either the drain electrode or source electrode being connected to the data line, the gate electrode being connected to the scanning line, the ohmic contact layer being formed with the n-type amorphous silicon layer;

a pixel electrode connected to either the drain electrode or the source electrode; and a storage capacitance line having the n-type amorphous silicon layer and the storage capacitance line at least a portion of which is overlapping with a portion of the pixel electrode.

* * * * *